United States Patent [19]

Sugiura et al.

[11] 4,440,913
[45] Apr. 3, 1984

[54] COATING COMPOSITION FOR PLIABLE SUBSTRATES

[75] Inventors: Shinji Sugiura; Yasuhiro Fujii; Katsunori Sato; Tuguo Nezu; Yasumasa Okumura, all of Hiratsuka, Japan

[73] Assignee: Kansai Paint Co., Ltd., Hyogo, Japan

[21] Appl. No.: 452,047

[22] Filed: Dec. 22, 1982

[30] Foreign Application Priority Data

Dec. 25, 1981 [JP] Japan .................. 56-209315
Dec. 25, 1981 [JP] Japan .................. 56-209316

[51] Int. Cl.³ ............................................. C08L 67/04
[52] U.S. Cl. ................................. 525/443; 525/444
[58] Field of Search ............. 525/415, 443, 444, 441; 528/302, 354

[56] References Cited

U.S. PATENT DOCUMENTS 3,502,623  3/1970  Hurworth et al. .................. 528/354
4,211,689  7/1980  Borman .............................. 525/444

FOREIGN PATENT DOCUMENTS 51-1041093  4/1976  Japan .................................. 528/354

*Primary Examiner*—Theodore E. Pertilla
*Attorney, Agent, or Firm*—Wenderoth, Lind & Ponack

[57] ABSTRACT

In a heat-curable coating composition containing an oil-free polyester resin and an aminoaldehyde resin as binder components, the improvement wherein (A) the materials for said oil-free polyester resin contain 40 to 75% by weight, based on the total weight of said materials, of at least one polyester-forming compound selected from the group consisting of (a) an aliphatic dibasic acid represented by the formula $HOOC\text{-}(CH_2)_n\text{-}COOH$ wherein n is an integer of 4 to 10 as a polybasic acid, (b) an aliphatic glycol represented by the formula $HO\text{-}(CH_2)_n\text{-}OH$ wherein n is an integer of 4 to 10 as a polyhydric alcohol, and (c) a lactone represented by the formula

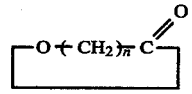

wherein n is an integer of 4 to 10, (B) the entire polybasic acid components of the polyester resin contain at least 10%, based on the total weight of said polybasic acid components, of an alicyclic polybasic acid or its anhydride, and (C) the polyester resin has a hydroxyl value of 20 to 95.

3 Claims, No Drawings

COATING COMPOSITION FOR PLIABLE SUBSTRATES

This invention relates to a coating composition for pliable substrates, which is composed of an oil-free polyester resin and an aminoaldehyde resin of a specified composition and has excellent film stretchability. Coated films obtained from the coating composition of this invention have excellent stretchability, pliability and rubbery elasticity adapted to the stretching, contraction and deformation of pliable substrates, and excellent outdoor durability, adhesion, water resistance, solvent resistance and chemical resistance, and are suitable for coating pliable component parts used in vehicles, ships, aircraft, building materials and various structural materials.

Elastomers such as natural and synthetic rubbers have previously been known as pliable materials. With an advance in synthetic resins and the development of their applications, plastic materials such as polyurethan, ABS resin and polyolefins have recently come into use in fields where metallic materials have previously been used, because of their light weight, moldability, impact energy absorbability and mechanical strength. In particular, in the automobile manufacturing industry, there has been an increasing demand for decreasing the weight of automobile bodies in order to reduce the fuel cost, and light-weight materials have come into widespread use. Furthermore, in order to secure safety during driving, a contrivance has been made in impact energy absorbing and alleviating devices, and plastic and elastomeric materials have positively superseded conventional materials for bumpers, fenders, etc. This move has necessitated the use of paints suitable for the coating of such pliable materials. The present invention has for its object the provision of a novel coating material suitable for the coating of various pliable materials.

The functions required of coating agents used for coating pliable substrates differ considerably from those required of coating agents for coating metallic materials. For example, coating agents for plastic bumpers must have the functions of conventional paints for the outside part of an automobile body, such as gloss, outdoor durability or weatherability, water resistance, solvent resistance, chemical resistance, and the ease of coating, and also require good film properties (adhesion, pliability, flexibility, impact strength, etc.) at ordinary temperatures and at low temperatures of $-20°$ to $-30°$ C. Furthermore, in view of their handling on the industrial coating line, they are required to be one-package paints having good storability.

As an extensible coating composition meeting these needs, U.S. Pat. Nos. 3,954,899 and 3,912,790 (corresponding to Japanese Patent Publication No. 32568/1973) discloses the joint use of a urethan-modified product of a polyester polyol and/or a urethane-modified product of a polyether polyol and an aminoplasto resin. The production of the urethan-modified resins is complex in process steps and requires expensive reactant materials.

In order to develop a paint meeting the aforesaid requirements by combining an oil-free polyester resin and an amino resin without using an expensive urethan-modified resin which requires a complex manufacturing process, the present inventors conducted experimental investigations, and consequently developed a linear polyester resin (or a polyester resin having a major proportion of linear skeletal portions) containing many methylene chains in the molecules and having a low hydroxyl value by using a specified amount of an alicyclic polybasic acid as one reactant. It has also been found that a combination of this polyester resin with an aminoaldehyde resin satisfactorily serves as a heat-curable binder for pliable materials.

It has commonly been believed in the art that a resin binder applicable to pliable substrates should be a urethan-modified resin. The present invention, however, surpasses this conventional belief, and provides an advantageous coating technique.

Generally, a coated film obtained from an oil-free polyester/amino resin binder has excellent adhesion, mechanical properties and outdoor durability, but because the intermolecular cohesive force is strong during the film-forming step, cratering occurs during the coating operation and tends to cause crater-like holes or raisings and depressions in the coated film. Furthermore this binder has poor compatibility with other resins and the dispersibility of a pigment in the binder is poor. Hence, a special contrivance is required in order to prepare a feasible paint having aesthetic and protective properties by using this binder. As a measure against this problem in the field of top coating materials for metallic substrates, the present applicants already suggested in Japanese Laid-Open Patent Publication No. 20068/1981 a technique of removing the aforesaid defects during coating and preventing the reduction of the compatibility of the aforesaid binder by combining an oil-free polyester having a specified proportion of a saturated alicyclic polybasic acid in its acid component with an amino resin.

In the investigations of the present inventors, the problem to be solved is not only to meet the various requirements for coating agents to be applied to pliable materials, such as the stretchability of a coated film and good film properties at low temperatures, but also to remedy the defects of the oil-free polyester resin as much as possible.

In the coating composition of this invention, therefore, the oil-free polyester resin as a binder component has the following characteristics. A methylene long chain $+CH_2+_n$ (n is an integer of 4 to 10) bond is introduced as a component which imparts the action of intramolecularly plasticizing the resin, and a specified proportion of an alicyclic polybasic acid is included as a reactant in order to impart good film appearance, water resistance, chemical resistance and outdoor durability and pigment dispersibility without imparing stretchability. Furthermore, by restricting the use of a material having at least 3 hydroxyl or carboxyl groups in the molecules, the degree of branching within the molecules is restricted and a linear structure or a structure having a major proportion of linear skeletal portions is provided. At the same time, the hydroxyl value is held at a low level in order not to reduce the stretchability of a coated film as a result of excessive advancing of crosslinking reaction in the presence of the aminoaldehyde resin. The present invention is based on this idea, and by combining such a resin with an amino resin, a heat-curable stretchable coating composition having properties excelling those of the aforesaid urethan-modified resin paint can be produced.

The present invention thus provides a heat-curable coating composition for pliable substrate, said composition containing an oil-free polyester resin and an aminoaldehyde resin as binder components, wherein (A) the materials for said oil-free polyester resin contain 40 to 75% by weight, based on the total weight of said materials, of at least one polyester-forming compound selected from the group consisting of (a) an aliphatic dibasic acid represented by the formula HOOC―(CH$_2$)$_n$―COOH wherein n is an integer of 4 to 10 as a polybasic acid, (b) an aliphatic glycol represented by the formula HO―(CH$_2$)$_n$―OH wherein n is an integer of 4 to 10 as a polyhydric alcohol, and (c) a lactone represented by the formula

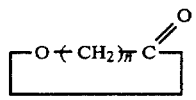

wherein n is an integer of 4 to 10, (B) the entire polybasic acid components of the polyester resin contain at least 10%, based on the total weight of said polybasic acid components, of an alicyclic polybasic acid or its anhydride, and (C) the polyester resin has a hydroxyl value of 20 to 95.

Examples of the aliphatic diabasic acid of the formula HOOC―(CH$_2$)$_n$―COOH used as a material for the oil-free polyester resin used in this invention include adipic acid, pimelic acid, suberic acid, azelaic acid, sebacic acid, nonane-1,9-dicarboxylic acid, and decane-1,10-dicarboxylic acid. They may be used either singly or as a mixture of two or more.

Examples of the aliphatic glycol of the formula HO―(CH$_2$)$_n$―OH include 1,4-butylene glycol, 1,5-pentanediol, 1,6-hexanediol, 1,7-heptanediol, 1,8-octanediol, 1,9-nonanediol, and 1,10-decanediol. They may be used either singly or as a mixture of two or more.

Examples of the lactone of the formula

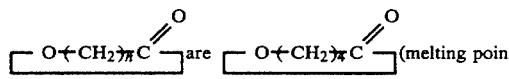 are 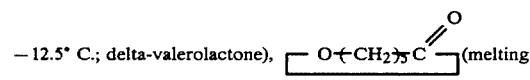 (melting point

−12.5° C.; delta-valerolactone),  (melting point −1° C.; epsilon-caprolactone), 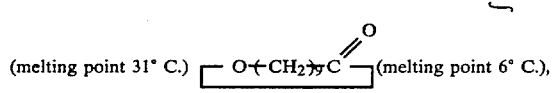

(melting point 31° C.) 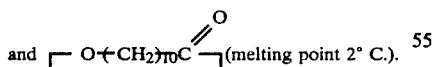 (melting point 6° C.), and 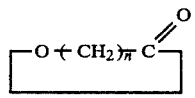 (melting point 2° C.).

epsilon-Caprolactone is preferred.

Illustrative of the alicyclic polybasic acid or its anhydride to be included in the entire polybasic acid components of the oil-free polyester resin are hexahydrophthalic acid and its anhydride, hexahydrotrimellitic acid and its anhydride, methylhexahydrophthalic acid and its anhydride, tetrahydrophthalic acid and its anhydride, methyltetrahydrophthalic acid and its anhydride, and hexahydroterephthalic acid. At least one of these dibasic acids or the anhydrides thereof is preferably used. Where the resulting coating composition is intended as a top coat which requires a high level of weatherability, it is preferred to minimize the amount of an alicyclic unsaturated acid such as tetrahydrophthalic acid and its anhydride, or not to use such an unsaturated acid.

In addition to the aforesaid aliphatic dibasic acid and alicyclic polybasic acid or its anhydride, those acids or anhydrides thereof which are used in the production of ordinary oil-free polyesters are used in this invention. Examples of such materials include polybasic acids or the anhydrides thereof such as ophthalic acid and its anhydride, trimellitic acid and its anhydride, pyromellitic acid and its anhydride, isophthalic acid and its dimethyl ester, terephthalic acid and its dimethyl ester, succinic acid and its anhydride, fumaric acid, maleic anhydride, methylcyclohexenetricarboxylic acid and its anhydride, 3,6-endomethylene tetrahydrophthalic acid and its anhydride, and itaconic acid; and monobasic acids replacing a minor amount of such a polybasic acid, such as benzoic acid and p-tert-butylbenzoic acid.

The ordinary oil-free polyester, as referred to herein, means a polyester composed substantially of a condensation product of an aliphatic polybasic acid, an aromatic polybasic acid, or the anhydrides thereof and a polyhydric alcohol. Examples are the oil-free polyester resin (also called oil-free alkyd resin) derived from adipic acid, isophthalic acid, trimethylolpropane and neopentyl glycol which is described at page 103 of a Japanese-language publication entitled "Guide to Synthetic Resins for Paints" written by Kyozo Kitaoka and published by K. K. Kobunshi Kankokai in June 1978.

The polyhydric alcohol includes not only the aliphatic glycols HO―(CH$_2$)$_n$―OH (n=an integer of 4 to 10) mentioned above, but also those polyhydric alcohols which are used in the production of ordinary oil-free polyesters, such as ethylene glycol, propylene glycol, diethylene glycol, dipropylene glycol, triethylene glycol, 1,2-butylene glycol, 1,3-butylene glycol, 2,3-butylene glycol, neopentyl glycol, 2,5-hexanediol, an ester formed between hydroxypivalic acid and neopentyl glycol, 2,2,4-trimethyl-1,3-pentanediol, bisphenol dihydroxypropyl ether, tricyclodecane dimethanol(5,2,1,0,2,6), 1,4-cyclohexanedimethanol, dimethylolpropionic acid, trimethylolethane, trimethylolpropane, glycerol, tris(2-hydroxyethyl) isocyanurate, pentaerythritol, diglycerol, dipentaerythritol, sorbitol, and tris-hydroxymethylaminoethane.

In the oil-free polyester resin used in this invention, at least one polyester-forming compound selected from the group consisting of (a) the aliphatic dibasic acid HOOC―(CH$_2$)$_n$―COOH, (b) the aliphatic glycol HO―(CH$_2$)$_n$―OH and (c) the lactone

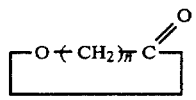

(wherein n is an integer of from 4 to 10) (the first two being respectively used as a polybasic acid component and a polyhydric alcohol component) should be used in a proportion of 40 to 75%, preferably 45 to 70%, by weight based on the entire starting materials for the polyester resin. When all of the above three materials are used, the total amount of these falls within the above specified range (40 to 75% by weight). The same can be said in the case of using any two of these materials. If the proportion of the polyester-forming compound is below 40% by weight, the stretchability of a coated film prepared from the resulting coating composition is poor, and the properties, especially flexibility, of the coated film become poor. If it is above 75% by weight, the water resistance, chemical resistance and hardness of the coated film are degraded.

Furthermore, the oil-free polyester resin used in this invention should contain at least 10%, preferably 12 to 80%, based on the total weight of the polybasic acid components, of an alicyclic polybasic acid or its anhydride. If the proportion of the alicyclic polybasic acid or its anhydride is less than 10% by weight, it is difficult to maintain a balance between the pigment dispersibility, outdoor durability (especially gloss retention) or hardness and stretchability.

The oil-free polyester resin used in this invention should have a hydroxyl value of 20 to 95, preferably 30 to 85. If the hydroxyl value is less than 20, crosslinkage becomes insufficient in the curing of a coated film prepared from the resulting coating composition, and the water resistance, solvent resistance, chemical resistance and hardness of the coated film are reduced. If it is above 95, the degree of crosslinking of the resin increases excessively, and the stretchability of the coated film is reduced, and the properties of the coated film at low temperatures become poor.

The hydroxyl value is measured by an acetylation method using acetic anhydride and pyridine, and defined as the number of milligrams of potassium hydroxide which is in the same molar proportion as the hydroxyl groups contained per gram of the resin.

It is preferred that the oil-free polyester used in this invention be a mixture of two or more polyesters obtained from materials containing at least one of the polyester-forming compounds (a), (b) and (c). In this case, the total proportion of the polyester-forming compounds (a), (b) and (c) in each polyester resin should be 40 to 70% by weight based on the total weight of the mixed polyester resin.

A preferred polyester resin mixture is composed of a relatively soft polyester resin containing at least 60% by weight, based on the total weight of the materials for the polyester resin, of at least one of the polyester-forming compounds (a), (b) and (c), and a relatively hard polyester resin containing up to 40% by weight, based on the total weight of the materials for the polyester resin, of at least one of the polyester-forming compounds (a), (b) and (c). Preferably, the contents of at least one of the polyester-forming compounds (a), (b) and (c) is 60 to 90% by weight in the soft polyester, and up to 30% by weight in the hard polyester. In the mixture of the relatively soft polyester and the relatively hard polyester, the relatively soft polyester acts as a component imparting an intramolecular plasticizing action and introduces many methylene long-chain $+CH_2+_n$ (n is an integer of 4 to 10) bonds, with the consequence that it gives excellent stretchability and good film properties at low temperatures to a coated film obtained from the resulting coating composition. On the other hand, the relatively hard polyester restricts the introduction of the aforesaid methylene long-chain bonds to minimize their amounts (in some cases completely inhibits their introduction), and serves to improve the hardness, water resistance and chemical resistance of the coated film. By using these two polyesters in a specified proportion, it is possible to maintain a good balance between the stretchability or low-temperature mechanical properties of the coated film and its hardness, water resistance, chemical resistance, etc., which balance is difficult to achieve by a single polyester resin.

The alicyclic polybasic acid component can be introduced into the mixed polyester resin by applying the technique suggested in the above-cited Japanese Laid-Open Patent Publication No. 20068/1981, namely by using a specified amount of the alicyclic polybasic acid or its anhydride as a reactant in the synthesis of one or both of the polyester resins in the mixture.

The production of an oil-free polyester resin from the above-described materials in this invention does not require any special reaction apparatus and reaction conditions, and may be effected in the same way as in the production of ordinary alkyd resins for paints. For example, such an oil-free polyester resin can be produced by polycondensing the aforesaid acid and alcohol components in a reaction vessel at a temperature of 200° to 250° C., while distilling off the water of condensation formed during the reaction. During this time, the viscosity and the acid value of the reaction mixture are monitored, and the reaction is terminated.

The aminoaldehyde resin to be used in combination with the oil-free polyester resin in this invention is produced by reacting an aldehyde with an amino component such as melamine, urea, benzoguanamine, acetoguanamine, steroguanamine, spiroguanamine or dicyandiamide. Examples of the aldehyde are formaldehyde, paraformaldehyde, acetaldehyde and benzaldehyde. The aminoaldehyde resin is modified with a suitable alcohol. Examples of such a modifying alcohol include methyl alcohol, ethyl alcohol, n-propyl alcohol, i-propyl alcohol, n-butyl alcohol, i-butyl alcohol, 2-ethyl butanol, 2-ethyl hexanol, benzyl alcohol, lauryl alcohol, ethylene glycol monomethyl ether, ethylene glycol monoethyl ether, ethylene glycol monobutyl ether, diethylene glycol monomethyl ether diethylene glycol monoethyl ether, and diethylene glycol monobutyl ether. When the aminoaldehyde resin is hexamethoxymethylmelamine or a melamine resin resulting from the replacement of a part of its methoxy group by an alcohol having at least 4 carbon atoms, it is preferred to add a conventional curing catalyst such as p-toluenesulfonic acid.

The kind of solvent used in the coating composition of this invention is the same as solvents which are used in conventional thermosetting aminoalkyd resin paints and aminoacrylic resin paints. Examples include aromatic solvents such as toluene and xylene, ketone-type solvents such as methyl ethyl ketone and methyl isobutyl ketone, ester-type solvents such as n-butyl acetate and ethyl acetate, alcohol-type solvents such as methanol and n-butanol, Cellosolve-type solvents such as ethyl Cellosolve, butyl Cellosolve and ethylene glycol monoethyl ether acetate (Cellosolve acetate), carbitol-type solvents such as ethyl carbitol, butyl carbitol and diethylene glycol monoethyl ether acetate (carbitol acetate), saturated hydrocarbon-type solvents such as heptane, octane and cyclohexane, ether-type solvents, petroleum-type solvents, and mineral spirits. These solvents may be used singly or as a mixture of two or more.

The coating composition of this invention can be converted to a paint by incorporating a pigment by an ordinary pigment dispersing method. Examples of the pigment are inorganic pigments such as the oxides, hydroxides, chromates, silicates, sulfides, sulfates, and carbonates of metals, various organic pigments, carbon blacks and various kinds of metal flakes, all of which are used in ordinary paints. A clear coating composition without a pigment can of course be used in this invention.

As required, the coating composition of this invention may contain various known additives such as plasticizers, plastic resins, film-strengthening resins, dispersing agents, coated film surface adjusting agents, flowability adjusting agents, ultraviolet absorbers, ultraviolet stabilizers, antioxidants, curing accelerators and curing inhibitors.

The coating composition of this invention may be produced from the oil-free polyester resin, the aminoaldehyde resin, a pigment, additives, etc. by using the same apparatuses and process steps as in conventional processes for the production of paints. For example, the pigment is dispersed in a solution of the binder in a solvent by using a suitable dispersing machine such as a ball mill, a sand mill or a roll mill to prepare a pigment paste. Then, the required components are further added, and mixed uniformly by a dispersing device. The coating composition may be in the form of an enamel for one-coat finishing, a primer, an intermediate coat or a top coat (enamel), each of which may be prepared by using a pigment of any desired composition.

The coating composition of this invention may be coated by conventional coating methods. Specifically, the coating composition is diluted with a solvent to a viscosity suitable for coating and applied at room temperature or at an elevated temperature by using an air spray gun, an airless spray gun, various types of electrostatic coating machines, a dip coater, a roller coater, or a brush coater.

The coating composition of this invention should be crosslinked by heating after the application. The heating may be carried out at a temperature of, for example, 70° to 180° C. for a period of, for example, 1 to 100 minutes. The coating composition of this invention can be coated on a pliable substrate either directly or after applying a primer (which is the same or different from the coating composition of this invention). If desired, after the application of the coating composition of this invention, another paint may be coated on top of it as a finish.

A coated film prepared from the coating composition of this invention has good stretchability and pliability, excellent properties (adhesion, pliability, flexibility, impact strength) at low temperatures of from −20° to −30° C., and good water resistance, outdoor durability, appearance (gloss or build), solvent resistance and chemical resistance and ease of coating. It has very good adaptability as a coating agent for pliable substrates, particularly flexible plastic materials.

The following examples illustrate the present invention more specifically. In these examples, all percentages and parts are by weight unless otherwise specified.

[Examples of Resin Production]

PRODUCTION EXAMPLE 1

Production of an oil-free polyester resin solution A

A reactor of an alkyd resin producing apparatus equipped with a heating device, a stirrer, a refluxing device, a water separator, a rectifying column, a thermometer, etc. was charged with 9.83 parts of isophthalic acid, 34.58 parts of adipic acid, 12.16 parts of hexahydrophthalic anhydride, 10.58 parts of trimethylolpropane, 28.74 parts of 1,5-pentanediol, and 4.11 parts of neopentyl glycol, and the materials were heated. When the materials dissolved and were ready for stirring, stirring of the mixture was started, and the temperature was raised to 230° C. From 160° to 230° C., however, the temperature was elevated at a uniform rate over the course of 3 hours. The water of condensation formed during the reaction was distilled off out of the system through the rectifying column. When the temperature reached 230° C., the mixture was maintained at this temperature for 2 hours with stirring. Thereafter, the use of the rectifying column was suspended, and xylene was added to the reactor. The reaction was then continued under solvent reflux. When the acid value of the reaction mixture reached about 7, the reaction was terminated, and the reaction mixture was cooled. After cooling, 54.22 parts of xylene was added to prepare the aforesaid oil-free polyester resin solution A.

The oil-free polyester resin solution A had a solids concentration of 60.2%, a solution viscosity (Gardner bubble viscosity at 25° C.) of YZ, a resin acid value of 7.1 and a hydroxyl value of 79.

The contents of the aliphatic dibasic acid, the aliphatic glycol and the alicyclic polybasic anhydride in the materials of this polyester resin are shown in Table 1.

PRODUCTION EXAMPLES 2 TO 19

Production of oil-free polyester resin solutions B to I, S-1 to S-5, and H-1 to H-5 (the letter S represents a relatively flexible resin, and the letter H, a relatively hard resin)

The captioned oil-free polyester resin solutions were each prepared in the same way as in Production Example 1 using the materials shown in Table 1. In the production of the resin solutions C and S-2, 0.01 PHR (parts per hundred parts of the resin) of dibutyltin dilaurate was added as a reaction catalyst.

Table 1 summarizes the properties of the resin solutions and the resins, the contents of the aliphatic dibasic acid, the aliphatic glycol and the lactone, and the proportion of the alicyclic polybasic acid anhydride in the entire polybasic acid components.

The resulting oil-free polyester resin solutions A to D were used in Examples 1 to 4; the resin solutions E to I, in Comparative Examples 1 to 5; and the resin solutions S-1 to S-5 and H-1 to H-5 in the combinations shown in Table 2, in Examples 5 to 7 and Comparative Examples 6 to 10.

Separately, in Comparative Example 11, a urethan-modified resin was prepared and a paint was prepared by using it as a binder. The properties of this paint were compared with the resin composition described in Example 1.

TABLE 1

| Composition and | Production Example | | | | | | | | |
|---|---|---|---|---|---|---|---|---|---|
| | 1 | 2 | 3 | 4 | 5 | 6 | 7 | 8 | 9 |
| | Polyester resin | | | | | | | | |

TABLE 1-continued

| Characteristic values | A | B | C | D | E | F | G | H | I |
|---|---|---|---|---|---|---|---|---|---|
| Materials (Parts) | | | | | | | | | |
| iso-Phthalic acid | 9.83 | — | — | 9.72 | — | 19.57 | 12.89 | — | 16.40 |
| Phthalic anhydride | — | 16.82 | — | — | — | — | — | 16.84 | — |
| Adipic acid | 34.58 | 22.13 | 29.12 | 34.69 | 47.86 | 19.51 | 28.34 | 27.69 | 40.38 |
| Hexahydrophthalic anhydride | 12.16 | 17.51 | 8.77 | 12.16 | 5.91 | 18.16 | 11.96 | 11.68 | — |
| Trimethylolpropane | 10.58 | 6.60 | 10.69 | 10.58 | 8.22 | 8.43 | 13.00 | 3.05 | 9.53 |
| Neopentyl glycol | 4.11 | 14.58 | 3.56 | 16.23 | — | 22.07 | 4.04 | 9.86 | 9.04 |
| 1,6-Hexanediol | — | 22.36 | — | — | 38.01 | — | 29.77 | 30.88 | — |
| 1,5-Pentanediol | 28.74 | — | — | 16.62 | — | 12.26 | — | — | 24.65 |
| 1,4-Butylene glycol | — | — | 15.38 | — | — | — | — | — | — |
| ε-Caprolactone | — | — | 32.48 | — | — | — | — | — | — |
| Characteristic value of the solution | | | | | | | | | |
| Solids concentration (%) | 60.2 | 60.0 | 60.3 | 60.0 | 60.1 | 59.9 | 60.4 | 60.0 | 59.8 |
| Viscosity (25° C., Gardner bubble viscosity) | YZ | V | Y | X | U | R | RS | KL | YZ |
| Characteristic value of the resin | | | | | | | | | |
| Acid value | 7.1 | 6.9 | 7.0 | 7.2 | 6.8 | 6.9 | 7.1 | 5.0 | 7.1 |
| Hydroyxyl value | 79 | 35 | 84 | 76 | 65 | 74 | 112 | 17 | 75 |
| Total content (%) of the polyester-forming compounds (a), (b) and (c) in the entire materials | 63 | 45 | 76 | 51 | 86 | 32 | 58 | 59 | 65 |
| Content (%) of the alicyclic polybasic acid anhydride in the entire polybasic acid components | 22 | 31 | 23 | 22 | 11 | 32 | 23 | 21 | 0 |

| | Production Example | | | | | | | | | |
|---|---|---|---|---|---|---|---|---|---|---|
| | 10 | 11 | 12 | 13 | 14 | 15 | 16 | 17 | 18 | 19 |
| Composition and | Polyester resin | | | | | | | | | |
| Characteristic values | S-1 | S-2 | S-3 | S-4 | S-5 | H-1 | H-2 | H-3 | H-4 | H-5 |
| Materials (Parts) | | | | | | | | | | |
| iso-Phthalic acid | — | — | — | — | — | 19.43 | — | — | — | 13.10 |
| Phthalic anhydride | — | — | 16.85 | — | 11.88 | — | 17.30 | — | 33.92 | 17.53 |
| Adipic acid | 43.75 | 42.54 | 27.70 | 41.55 | 43.96 | 25.63 | — | 17.02 | — | 25.94 |
| Hexahydrophthalic anhydride | 12.30 | — | 11.69 | 12.52 | — | 12.02 | 40.79 | 40.70 | 23.53 | — |
| trimethylolpropane | 10.71 | 12.07 | 3.05 | 16.34 | 10.76 | 10.46 | 6.26 | 8.33 | 3.07 | 10.58 |
| Neopentyl glycol | — | — | 3.95 | — | — | 32.46 | 35.65 | 33.95 | 21.45 | 32.85 |
| 1,6-Hexanediol | — | — | 30.45 | — | — | — | — | — | 18.03 | — |
| 1,5-Pentanediol | 33.24 | — | 6.31 | 29.59 | 33.40 | — | — | — | — | — |
| 1,4-Butylene glycol | — | 20.03 | — | — | — | — | — | — | — | — |
| ε-Caprolactone | — | 25.36 | — | — | — | — | — | — | — | — |
| Characteristic value of the solution | | | | | | | | | | |
| Solids concentration (%) | 60.0 | 60.01 | 59.9 | 60.0 | 60.2 | 60.1 | 59.8 | 59.8 | 60.0 | 60.01 |
| Viscosity (25° C., Gardner bubble viscosity) | X | Y | OP | V | WX | WX | MN | W | I | U |
| Characteristic value of the resin | | | | | | | | | | |
| Acid value | 7.0 | 9.0 | 6.8 | 7.0 | 6.9 | 8.1 | 7.1 | 7.0 | 7.2 | 7.0 |
| Hydroxyl value | 76 | 74 | 15 | 125 | 78 | 73 | 38 | 50 | 15 | 76 |
| Total content (%) of the polyester-forming compounds (a), (b) and (c) in the entire materials | 77 | 88 | 64 | 65 | 77 | 26 | 0 | 17 | 18 | 26 |
| Content (%) of the alicyclic polybasic acid anhydride in the entire polybasic acid components | 22 | 0 | 21 | 23 | 0 | 21 | 70 | 71 | 41 | 0 |

[Preparation of a coating material (pliable substrate)]

A 3 mm thick plate of a reactive injection mold polyurethan resin for automobile bumpers was degreased with trichloroethane, and a polyurethan resin primer capable of drying upon volatilization was coated on its surface to a dry film thickness of about 10 microns to prepare a coating material.

EXAMPLE 1

A white enamel was prepared by using the oil-free polyester resin solution A obtained in Production Example 1 in accordance with the following formulation. A suitable amount of a mixture of xylene, Cellosolve acetate and butyl Cellosolve in a weight ratio of 50:25:25, and the pigment was dispersed by using a ball mill.

| Formulation | |
|---|---|
| 60% oil-free polyester resin solution A | 117 parts |
| 60% aminoaldehyde resin solution *1 | 50 parts |
| Rutile titanium oxide *2 | 80 parts |
| | 247 parts |

*1 Alcohol-modified melamine resin varnish (Uban 28SE manufactured by Mitsui Toatsu Chemicals, Inc.).
*2 Titanium White JR-602 (a tradename for a product of Teikoku Chemical Industry Co., Ltd.)

As coated film surface adjusting agents, 0.05 PHR of Modaflow (a product of Monsanto Chemical Co.) and 0.01 PHR of Silicone Oil KP-323 (a product of Shinetsu Chemical Co., Ltd.) were added to the white enamel.

The resulting enamel was diluted to a viscosity of 25 seconds (Ford cup #4, 20° C.) with a mixed solvent consisting of Swasol #1000 (an aromatic solvent manufactured by Maruzen Oil Co., Ltd.), xylene, butyl acetate and n-butanol in a weight ratio of 30:20:30:20.

The diluted enamel was air-sprayed onto the coating material to a dry thickness of about 30 microns, allowed to stand for 10 minutes at room temperature, and then baked at 120° C. for 30 minutes in an electric hot air-type oven to produce a coated plate.

The resulting coated plate was tested, and the results are shown in Table 3.

EXAMPLES 2 TO 4 AND COMPARATIVE EXAMPLES 1 TO 5

By employing the same methods of preparing a coating composition, diluting it and coating it on the coating material as in Example 1, coating compositions and coated plates of Examples 2 to 4 were produced by using the oil-free polyester resin solutions B, C and D, and coating compositions and coated plates of Comparative Examples 1 to 5 were produced by using the oil-free polyester resin solutions E, F, G, H and I.

The correspondence of the Examples and the Comparative Examples to the oil-free polyester resin solutions are shown in Table 2, and the results of testing the coated plates are shown in Table 3.

TABLE 2

| Example or Comparative Example | Oil-free polyester resin solution |
|---|---|
| Example 1 | A |
| Example 2 | B |
| Example 3 | C |
| Example 4 | D |
| Comparative Example 1 | E |
| Comparative Example 2 | F |
| Comparative Example 3 | G |
| Comparative Example 4 | H |
| Comparative Example 5 | I |

TABLE 3

| Test item | Example 1 | Example 2 | Example 3 | Example 4 | Comparative Example 1 | Comparative Example 2 | Comparative Example 3 | Comparative Example 4 | Comparative Example 5 |
|---|---|---|---|---|---|---|---|---|---|
| 1 Appearance upon finishing (gloss and build of the film) | Good | Good | Good | Good | Good | Good | Good | Good | Vague gloss |
| 2 60° Gloss | 92 | 93 | 90 | 91 | 88 | 92 | 88 | 92 | 85 |
| 3 Pencil hardness (*1) | 4B | 4B | 4B | 4B | 6B | 4B | 4B | 5B | 5B |
| 4 Film properties at low temperatures (flexural resistance −30° C.) (*2) | Acceptable | Acceptable | Acceptable | Acceptable | Acceptable | Non-acceptable | Non-acceptable | Acceptable | Acceptable |
| 5 Acid resistance (*3) | No change | No change | No change | No change | Gloss lost | No change | No change | Gloss lost | Gloss lost |
| 6 Alkali resistance (*4) | No change | No change | No change | No change | Gloss lost | No change | No change | Gloss lost | No change |
| 7 Solvent resistance (*5) | Good | Good | Good | Good | Good | Good | Good | Gloss lost | Good |
| 8 Moisture resistance (*6) | No change | No change | No change | No change | Blisters occurred; gloss lost | No change | No change | Blisters occurred; gloss lost | A small number of blisters occurred |
| 9 Weatherability (gloss retention % after exposure to irradiation of Sunshine Weather-Ometer for 800 hours) | 80 | 85 | 78 | 80 | 70 | 83 | 83 | 61 | 50 |

(*1) The pencil hardness of a coated film formed on a reactive injection mold urethan resin material could not be measured because of the softness of the material. Hence, a test sample was prepared by coating the coating composition on a polished mild steel plate under the same conditions as in the case of using the reactive injection mold urethan resin material, and baking the coated film. The pencil hardness of the test sample was measured. The pencil hardness was evaluated by the presence or absence of a scratch by a pencil of each hardness at 25° C.
(*2) The coated plate was placed in a refrigerator at −30° C. for 4 hours. Immediately then, it was bent 180° by interposing an iron bar (10 mm in diameter) with the coated surface turned outwardly. The coated film at the bent portion was observed, and rated as "acceptable" when no cracking occurred, and as "non-acceptable" when cracking occurred.
(*3) A 10% aqueous solution of sulfuric acid (0.5 cc) was dropped onto the coated surface, and the sample was then left to stand for 24 hours at a temperature of 20° C. and a relative humidity of 75%. The surface was then washed with water and observed.
(*4) A 5% aqueous solution of sodium hydroxide (0.5 cc) was dropped onto the coated surface, and the sample was left to stand for 24 hours at a temperature of 20° C. and a relative humidity of 75%. The surface was then washed with water and observed.
(*5) A gauze was wetted well with an automobile gasoline (Nisseki Silver Gasoline manufactured by Nippon Oil Co., Ltd.), and a 10 cm length of the coated surface was rubbed strongly with it through 8 reciprocations. Then, the coated surface was observed. When the coated surface was substantially free from scratch and the loss of gloss, the sample was determined to have "good" solvent resistance.
(*6) The coated plate was left to stand for 5 days in a moisture resistance testing box kept at a temperature of 50° C. and a relative humidity of 100%. Then, the coated plate was withdrawn and the condition of the coated surface was observed and evaluated.

EXAMPLE 5

A white enamel was prepared by using the oil-free polyester resin solutions S-1 and H-1 obtained in Production Examples 10 and 15 respectively in accordance with the following formulation. A suitable amount of a mixture of xylene, Cellosolve acetate and butyl Cellosolve in a weight ratio of 50:25:25 was added as a dispersing solvent, and the pigment was dispersed by a ball mill.

| Formulation | |
|---|---|
| 60% Oil-free polyester resin solution S-1 | 58.5 parts |
| 60% Oil-free polyester resin solution H-1 | 58.5 parts |
| 60% Aminoaldehyde resin solution (*1) | 50 parts |
| Rutile titanium oxide (*2) | 80 parts |
| | 247 parts |

(*1): Alcohol-modified melamine resin varnish (Uban 28SE manufactured by Mitsui Toatsu Chemicals, Inc.)
(*2): Titanium White JR-602 (manufactured by Teikoku Chemical Industry Co., Ltd.)

As coated film surface adjusting agents, 0.05 PHR of Modaflow (a product of Monsanto Chemical Co.) and 0.01 PHR of Silicone Oil KP-323 (a product of Shinetsu Chemical Co., Ltd.) were added to the white enamel.

The resulting enamel was diluted to a viscosity of 25 seconds (Ford cup #4, 20° C.) with a mixed solvent consisting of Swasol #1000 (an aromatic solvent manufactured by Maruzen Oil Co., Ltd.), xylene, butyl acetate and n-butanol in a weight ratio of 30:20:30:20. The diluted enamel was air-sprayed onto the coating material to a dry film thickness of about 30 microns. The coated material was left to stand at room temperature for 10 minutes, and then baked in an electric hot air-type oven at 120° C. for 30 minutes. The resulting coated plate was tested, and the results are shown in Table 5.

EXAMPLES 6 AND 7 AND COMPARATIVE EXAMPLES 6 TO 10

Coating compositions and coated plates of Examples 6 and 7 and Comparative Examples 6 to 10 were produced by the same methods of paint preparation, dilution and coating as in Example 5 using the oil-free polyester resin solutions S-2 to S-5 and H-1 to H-5. The coated plates were tested, and the results are shown in Table 5. Table 4 summarizes the proportions of resins in the coating compositions, the total content of the aliphatic dibasic acid, aliphatic glycol and lactone in the entire materials for the oil-free polyester resins, the content of the alicyclic polybasic acid anhydride in the entire polybasic acid components, and the average hydroxyl values of the oil-free polyester resins.

TABLE 4

| | Example | | | Comparative Example | | | | |
|---|---|---|---|---|---|---|---|---|
| | 5 | 6 | 7 | 6 | 7 | 8 | 9 | 10 |
| Proportions (solids) of the oil-free polyester resins | S-1 35 H-1 35 | S-2 56 H-2 14 | S-3 35 H-3 35 | S-2 59.5 H-3 10.5 | S-3 31.5 H-2 38.5 | S-4 35 H-1 35 | S-3 42 H-4 28 | S-5 35 H-5 35 |
| Proportion of aminoaldehyde resin (solids) | 30 | 30 | 30 | 30 | 30 | 30 | 30 | 30 |
| Proportion of rutile titanium oxide | 80 | 80 | 80 | 80 | 80 | 80 | 80 | 80 |
| Total content (%) of the compounds (a), (b) and (c) in the entire materials for the oil-free polyester resin | 52 | 70 | 40 | 77 | 29 | 46 | 46 | 52 |
| Content (%) of the alicyclic polybasic acid anhydride in the entire polybasic acid components of the oil-free polyester resin | 22 | 14 | 46 | 11 | 48 | 32 | 29 | 0 |
| Average hydroxyl value of the oil-free polyester resin component | 75 | 67 | 33 | 70 | 28 | 102 | 15 | 77 |

TABLE 5

| | Test item | Example | | | Comparative Example | | | | |
|---|---|---|---|---|---|---|---|---|---|
| | | 5 | 6 | 7 | 6 | 7 | 8 | 9 | 10 |
| 1 | Appearance upon finishing (gloss and build of the and build of the film) | Good | Good | Good | Good | Good | Gloss slightly poor | Good | Vague gloss |
| 2 | 60° Gloss | 91 | 93 | 92 | 92 | 92 | 89 | 93 | 85 |
| 3 | Pencil hardness (*1) | 2B | 3B | 2B | 6B | 2B | 3B | 4B | 5B |
| 4 | Film properties at low temperature (flexurl resistance at −30° C.)(*2) | Acceptable | Acceptable | Acceptable | Acceptable | Non-acceptable | Non-acceptable | Acceptable | Acceptable |
| 5 | Acid reistance (*3) | No change | No change | No change | Gloss lost | No change | No change | Gloss lost | Gloss lost |
| 6 | Alkali resistance (*4) | No change | No change | No change | Gloss lost | No change | No change | No change | No change |
| 7 | Solvent resistance (*5) | Good | Good | Good | Good | Gloss slightly reduced | Good | Gloss lost | Good |
| 8 | Moisture resistance | No change | No change | No | Minute | No | No change | Blisters | Minute |

TABLE 5-continued

| | Example | | | Comparative Example | | | | |
|---|---|---|---|---|---|---|---|---|
| Test item | 5 | 6 | 7 | 6 | 7 | 8 | 9 | 10 |
| (*6) | | | change | blisters occurred | change | gloss lost | occurred; occurred | blisters |
| 9 Weatherability (gloss retention % after exposure to irradiation of Sunshine Weather-Ometer for 800 hours) | 82 | 83 | 86 | 66 | 85 | 84 | 60 | 52 |

COMPARATIVE EXAMPLE 11

The coating compositions of this invention described in Examples 1 and 5 were compared with a coating composition containing a urethan-modified resin as a binder component in regard to film properties.

(1) Preparation of the urethan-modified resin solution

A xylene solution of a polyester resin having a solids concentration of 60% was prepared in the same way as in Production Example 1 using 13.86 parts of neopentyl glycol, 4.47 parts of trimethylolpropane, 9.73 parts of adipic acid and 14.38 parts of isophthalic acid.

Then, 50.0 parts of polytetramethylene glycol, 13.10 parts of methanebis(cyclohexylisocyanate), 0.0001 part of dibutyltin dilaurate, 50 parts of methyl isobutyl ketone, 15 parts of Cellosolve acetate and 10 parts of tall oil were added to the resulting polyester resin solution, and urethanization was carried out at 80° C. for 10 hours. The resulting urethan-modified resin solution had a solids concentration of 50.0%.

(2) Preparation of a coating composition

A coating composition was prepared in the same way as in Example 1 except that 140 parts of the 50% urethan-modified resin solution obtained as in (1) above was used instead of 117 parts of the 60% oil-free polyester resin solution in the formulation of the white enamel in Example 1.

(3) Preparation of a coated plate and its testing

A coated plate was prepared by the same method as in Example 1 using the urethan-modified resin coating composition prepared in (2) above, and tested. The tests were carried out in accordance with the items shown in Table 3 by the same methods.

The results are shown in Table 6 below together with those obtained in Examples 1 and 5.

TABLE 6

| Test item | Comparative Example 11 | Example 1 | Example 5 |
|---|---|---|---|
| 1 Appearance on finishing | Good | Good | Good |
| 2 60° Gloss | 90 | 92 | 91 |
| 3 Pencil hardness | 4B | 4B | 2B |
| 4 Film properties at low temperatures | Acceptable | Acceptable | Acceptable |
| 5 Acid resistance | No change | No change | No change |
| 6 Alkali resistance | No change | No change | No change |
| 7 Solvent resistance | Good | Good | Good |
| 8 Moisture resistance | Minute blisters occurred | No change | No change |
| 9 Weatherability (%) | 71 | 80 | 82 |

Examples 1 to 7 are embodiments of the present invention, and the coating compositions used in these examples exhibit excellent quality in regard to the appearance, mechanical properties at low temperatures, chemical resistance, water resistance, solvent resistance and weatherability of the coated films.

In Comparative Examples 1 and 6, the total content of the aliphatic dibasic acid, the aliphatic glycol and the lactone in the oil-free polyester resins was larger than the upper limit specified in the present invention. The coating compositions used in these Comparative Examples were inferior in regard to the acid resistance, alkali resistance, moisture resistance, hardness and weatherability of the coated films.

In Comparative Examples 2 and 7, the total content of the aliphatic dibasic acid, the aliphatic glycol and the lactone was smaller than the lower limit specified in this invention, and the coating compositions used in these Comparative Examples were inferior in regard to mechanical properties (expecially flexibility) at low temperatures and solvent resistance of the coated films.

In Comparative Examples 3 and 8, the oil-free polyester resins used had a higher hydroxyl value than the upper limit specified in this invention, and the coating compositions used in these Comparative Examples were inferior in regard to the properties (especially flexibility) of the coated films at low temperatures.

In Comparative Examples 4 and 9, the oil-free polyesters used had a lower hydroxyl value than the specified lower limit, and the coating compositions used in these Comparative Examples showed acceptability in regard to the film properties at low temperatures, but were inferior in regard to the acid resistance, alkali resistance, solvent resistance moisture resistance and weatherability of the coated films because of insufficient crosslinking.

In Comparative Examples 5 and 10, the oil-free polyester resins did not contain the alicyclic polybasic acid. Because of poor pigment dispersibility, the appearance and weatherability of coated films prepared from the coating compositions used in these Comparative Examples were inferior, and a balance between hardness or chemical resistance and low-temperature film properties could not be maintained.

As seen in Comparative Example 11, it is evident that the coating adaptability of the coating composition of this invention to pliable materials far surpasses that of the coating composition prepared by using the urethan-modified resin.

Accordingly, the coating composition of this invention can be suitably used for the coating of pliable materials in place of the coating composition containing the urethan-modified resin.

What is claimed is:

1. In a heat-curable coating composition containing an oil-free polyester resin composed substantially of a condensation product of an aliphatic polybasic acid, an aromatic polybasic acid, or the anhydrides thereof and a polyhydric alcohol and an aminoaldehyde resin as binder components, the improvement wherein (A) the materials for said oil-free polyester resin contain 40 to 75% by weight, based on the total weight of said materials, of at least one polyester-forming compound selected from the group consisting of (a) an aliphatic dibasic acid represented by the formula HOOC—(CH$_2$)$_n$—COOH wherein n is an integer of 4 to 10 as a polybasic acid, (b) an aliphatic glycol represented by the formula HO—(CH$_2$)$_n$—OH wherein n is an integer of 4 to 10 as a polyhydric alcohol, and (c) a lactone represented by the formula

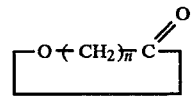

wherein n is an integer of 4 to 10, (B) the entire polybasic acid components of the polyester resin contain at least 10%, based on the total weight of said polybasic acid components, of an alicyclic polybasic acid or its anhydride, and (C) the polyester resin has a hydroxyl value of 20 to 95.

2. The composition of claim 1 wherein said oil-free polyester resin is a mixture of at least two oil-free polyester resins each derived from those materials which contain 40 to 75% by weight, based on the entire materials, of said at least one polyester-forming compound.

3. The composition of claim 2 wherein one of the oil-free polyester resins contains at least 60% by weight of said at least one polyester-forming compound, and the other polyester resin contains 0 to 40% by weight of said at least one polyester-forming compound.

* * * * *